United States Patent [19]
Nielson et al.

[11] Patent Number: 6,106,940
[45] Date of Patent: Aug. 22, 2000

[54] ADHESIVE COMPOSITIONS WITH ZWITTERIONIC TACKIFIERS AND PLASTICIZERS

[75] Inventors: Kent E. Nielson, Dorchester, Canada; Kai Li, Arcadia, Calif.; Terry J. Rayner, London, Canada

[73] Assignee: 3M Innovative Properties Company, St. Paul, Minn.

[21] Appl. No.: 09/040,024

[22] Filed: Mar. 17, 1998

[51] Int. Cl.$^7$ .............................. B32B 7/12; B32B 15/04
[52] U.S. Cl. ..................... 428/355 AC; 524/236
[58] Field of Search ...................... 524/236; 428/355 AC

[56] References Cited

U.S. PATENT DOCUMENTS

| | | | |
|---|---|---|---|
| 2,838,421 | 6/1958 | Sohl et al. | 117/122 |
| 3,096,202 | 7/1963 | De Groot Von Arx | 117/68.5 |
| 3,411,912 | 11/1968 | Dykstra et al. | 96/87 |
| 3,441,430 | 4/1969 | Peterson | 117/68.5 |
| 3,549,605 | 12/1970 | Dykstra et al. | 260/79.3 |
| 3,671,502 | 6/1972 | Samour et al. | 260/79.3 |
| 3,673,158 | 6/1972 | Reader et al. | 260/75 N |
| 3,723,260 | 3/1973 | Rushmere | 204/49 |
| 3,723,262 | 3/1973 | Rushmere | 204/55 R |
| 3,763,117 | 10/1973 | McKenna et al. | 260/78.5 E |
| 3,770,708 | 11/1973 | Knoepfel et al. | 260/80.73 |
| 3,861,948 | 1/1975 | Samour et al. | 117/122 PF |
| 3,865,770 | 2/1975 | Blake | 260/27 R |
| 3,890,292 | 6/1975 | Bohme et al. | 260/80.76 |
| 3,922,464 | 11/1975 | Silver et al. | 428/355 |
| 4,138,345 | 2/1979 | Williams | 252/8.55 D |
| 4,210,489 | 7/1980 | Markofsky | 162/164 R |
| 4,341,680 | 7/1982 | Hauber et al. | 525/329 |
| 4,413,080 | 11/1983 | Blake | 524/187 |
| 4,413,082 | 11/1983 | Gleichenhagen et al. | 524/243 |
| 4,442,258 | 4/1984 | Sunakawa et al. | 524/767 |
| 4,569,960 | 2/1986 | Blake | 524/145 |
| 4,985,487 | 1/1991 | Shih et al. | 524/548 |
| 5,106,416 | 4/1992 | Moffatt et al. | 106/20 |
| 5,144,060 | 9/1992 | Morita et al. | 560/170 |
| 5,208,295 | 5/1993 | Chaudhuri et al. | 525/327.6 |
| 5,216,048 | 6/1993 | Agarwal et al. | 524/60 |
| 5,256,751 | 10/1993 | Vanderlaan | 526/304 |
| 5,489,642 | 2/1996 | Gleichenhagen et al. | 524/504 |
| 5,652,296 | 7/1997 | Randen | 524/547 |
| 5,846,558 | 12/1998 | Nielson et al. | 424/448 |

FOREIGN PATENT DOCUMENTS

| | | | |
|---|---|---|---|
| 1053581 | 5/1979 | Canada | 167/166 |
| 1109888 | 9/1981 | Canada | 260/386.5 |
| 2040337 | 12/1991 | Canada | D21H 17/45 |
| 0 494 686 A1 | 7/1992 | European Pat. Off. | B01D 57/02 |
| 0 576 128 A1 | 12/1993 | European Pat. Off. | C08L 33/02 |
| 1077772 | 8/1967 | United Kingdom | C07C 141/10 |
| WO 93/06184 | 12/1992 | WIPO | C09J 133/06 |

OTHER PUBLICATIONS

"Statistical n–Butyl Acrylate–(Sulfopropyl)ammonium Betaine Copolymers. 5. Plasticization Studies", from Macromolecules 1993, 26, pp. 4919–4927.

*Primary Examiner*—James J. Seidleck
*Assistant Examiner*—U. K. Rajguru

[57] ABSTRACT

The invention relates to adhesive compositions, preferably those for pressure-sensitive adhesive tapes, comprising an adhesive polymer and, as tackifier or plasticizer, a zwitterionic compound. The zwitterionic compounds include those of formula I (I)

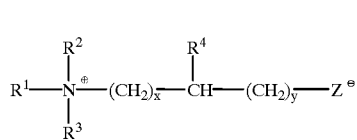

wherein $R^1$, $R^2$ and $R^3$ are each alkyl, hydroxyalkyl, aminoalkyl or aryl which may be interrupted in the alkyl chain by one or more oxygen atoms, $R^4$ is H or OH, $Z^\ominus$ is $CO_2^\ominus$ or $SO_3^\ominus$, x and y are each 0, 1 or 2 provided that the sum of x and y is less than or equal to 4.

9 Claims, No Drawings

ADHESIVE COMPOSITIONS WITH ZWITTERIONIC TACKIFIERS AND PLASTICIZERS

The invention relates to adhesive compositions comprising zwitterionic compounds as tackifiers or plasticizers, preferably pressure sensitive adhesive (PSA) compositions and adhesive tapes made with such compositions.

BACKGROUND OF THE INVENTION

The term zwitterion has been defined as a complex ion that is both negatively and positively charged.

Adhesive compositions commonly contain an adhesive polymer together with a tackifier or plasticizer. The adhesive polymer provides cohesion and the tackifier or plasticizer increases tack. Typically, tackifiers increase the glass transition temperature of polymers, whereas plasticizers lower the glass transition temperature of the polymers. However, both tackifiers and plasticizers improve the tack of adhesive polymers.

PSAs are used in a wide range of applications such as masking tapes, mending and sealing tapes, hair care tapes, electrical tapes, packaging tapes and labels. There is always a need to find new tackifiers and plasticizers for the compositions to improve their properties.

Further, applicant's copending application U.S. Ser. No. 09/042,980 entitled "Adhesive Compositions And Adhesive Tapes Comprising Zwitterionic Copolymers, And Novel Zwitterionic Copolymers". hereby incorporated by reference) discloses adhesive copolymers having a zwitterionic monomer component. Conventional tackifiers and plasticizers are not entirely satisfactory with these copolymers. It would be desirable to find tackifiers and plasticizers which would be more effective for use with such copolymers.

Conventional tackifiers include polysaccharide gums, rosins, rosin derivatives, alkyl/aryl hydrocarbon resins and derivatives, and petroleum-aliphatic resins. Conventional plasticizers include polyoxyethylene alkylphenyl ether phosphates, polyoxyethylenealkyl ether phosphates, polyethyleneglycolmonophenyl ethers, octylphenoxypoly (ethyleneoxy) ethanols and nonylphenoxypoly (ethyleneoxy) ethanols.

SUMMARY OF THE INVENTION

It has now been found that zwitterionic compounds are useful as tackifiers and plasticizers.

According to one aspect of the present invention there is provided an adhesive composition comprising an adhesive polymer and, as tackifier or plasticizer, a zwitterionic compound.

DETAILED DESCRIPTION OF THE PREFERRED EMBODIMENTS

The zwitterionic compounds are preferably sulfo- or carboxy-betaines. More preferably the zwitterionic compounds are selected from compounds of the following formula I:

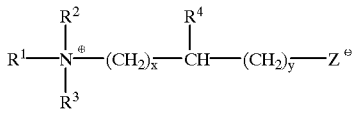

wherein
$R^1$, $R^2$ and $R^3$ are each alkyl, hydroxyalkyl, aminoalkyl or aryl which may be interrupted in the alkyl chain by one or more oxygen atoms,
$R^4$ is H or OH, preferably H,
$Z^\ominus$ is $CO_2^\ominus$ or $SO_3^\ominus$, preferably $SO_3^\ominus$
x and y are each 0, 1 or 2 provided that the sum of x and y is less than or equal to 4, preferably the sum of x and y is less than or equal to 3.

Preferably the alkyl groups in the above moieties of $R^1$, $R^2$ and $R^3$ have from 1 to 12 carbon atoms, more preferably from 1 to 8 and in particular from 1 to 2 carbon atoms.

It is also preferred that $R^2$ and $R^3$ are the same and $R^1$ is different.

Particular zwitterionic compounds which may be mentioned are:

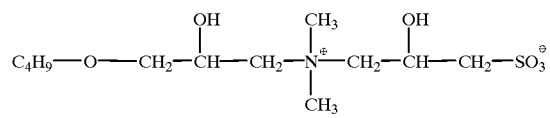

N-(2-hydroxy-3 -sulphopropyl)-N,N-dimethyl-N-(3-butyloxy-2-hydroxypropyl)-ammonium betaine

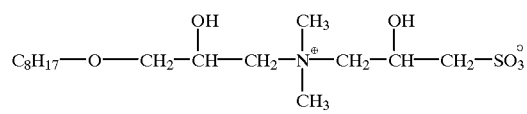

N-(2-hydroxy-3-sulphopropyl)-N,N-dimethyl-N-(3-octyloxy-2-hydroxypropyl)-ammoiium betaine

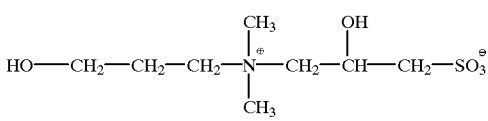

N-(2-hydroxy-3-sulphopropyl)-N,N-dimethyl-N-(3-hydroxypropyl)-amtnonium betaine

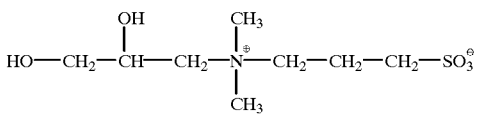

N-(3-sulphopropyl)-N,N-dimethyl-N-(2,3-dihydroxypropyl)-ammoniun betaine

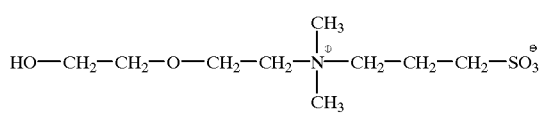

N-(3-sulphopropyl)-N-N-dimethyl-N-2-(2-hydroxyethyloxy) ethyl -ammonium betaine

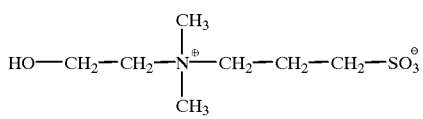

N-(3-sulphopropyl)-N,N-dimethyl-N-(2-hydroxyethyl)-ammonium betaine

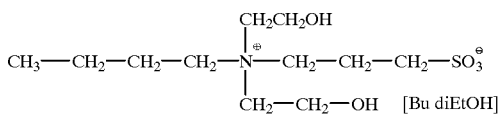

N-(3-sulphopropyl)-N,N-di(2-hydroxyethyl)-N-butyl-ammonium betaine

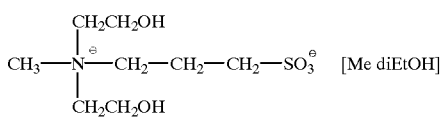

N-(3-sulphopropyl)-N,N-di(2-hydroxyethyl)-N-methyl-ammonium betaine

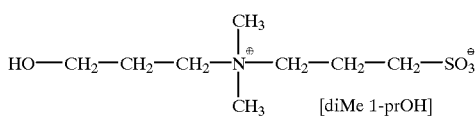

N-(3-sulphopropyl)-N,N-dimenthy(3hydroxypropyl)-N-ammonium betaine

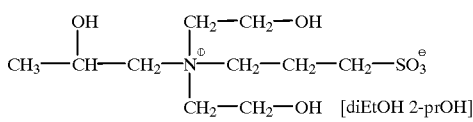

N-(3-sulplhopropyl)-N,N-di(2-hydroxyethyl)-N-(2-hydroxypropyl)-ammonium betaine

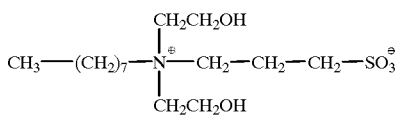

N-(3-sulphopropyl)-N,N-di(2-hydroxyetlyl)-N-octyl-ammonium betaine

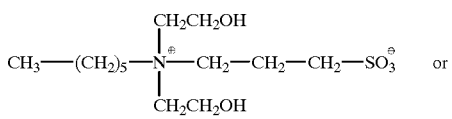

N-(3sulphopuropyl)-N,N-di(2-hydroxyethyl)-N-hexyl-ammonium betaine Generally speaking, when $R^4$ is OH, or when one of $R^1$, $R^2$ or $R^3$ has more than one hydroxyl group, the compounds of formula I tend to function as plasticizers.

The zwitterionic compounds are known (for example N-(2-hydroxy-3-sulphopropyl)-N,N-dimethyl-N-(3-hydroxypropyl) ammonium betaine is available from Inolex Chemical Company). They may be made by known methods, for example, the above compounds of formula I may be made by reacting an amine with a sultone or lactone. The reaction is indicated by the following reaction sequence for preparing a sulphobetaine:

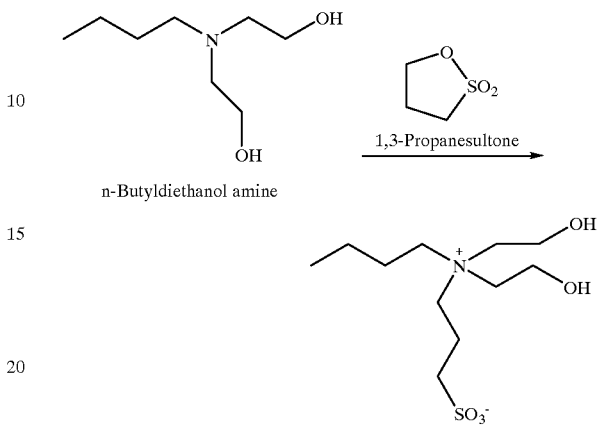

Since compounds of formula I are generally water-soluble, they are suitable as tackifiers or plasticizers in repulpable adhesive compositions. Whilst they may be used with a variety of adhesive polymers, including those with sulphonated polyesters, a particularly effective use is with adhesive copolymers containing a zwitterionic component. For example, they are suitable for use with the zwitterionic polymers disclosed in the abovementioned copending application (attorney docket No. 60557-4986).

The zwitterionic copolymer comprises a component derived from a zwitterionic monomer together with a component or components derived from a hydrophobic or hydrophilic monomer or a mixture of components derived from hydrophobic and hydrophilic monomers.

The zwitterionic monomer must be one which is copolymerizable with any other monomer used. The zwitterionic monomers include betaines. Mixtures of zwitterionic monomers may be used.

Suitable betaines include ammonium carboxylates, ammonium phosphates and ammonium sulphonates, preferably ammonium sulphonates. Particular zwitterionic monomers which may be mentioned are N-(3-sulphopropyl)-N-methacryloxy-ethyl-N,N-dimethyl ammonium betaine; N-(3-sulphopropyl)-N-acryloxyethyl-N,N-dimethyl ammonium betaine; N-(3-sulphopropyl)-N-methacrylamido-propyl-N, N-dimethyl ammonium betaine;

1-(3-sulfopropyl)-2-vinyl-pyridinium betaine;

N-(3-sulphopropyl)-N,N-diallyl-N-methyl ammonium betaine; and

N-(3-sulphopropyl)-N-allyl-N,N-dimethyl ammonium betaine.

Particularly preferred zwitterionic monomers are N-(3-sulphopropyl)-N-methacryloxy-ethyl-N,N-dimethyl ammonium betaine; and N-(3-sulphopropyl)-N-acryloxy-ethyl-N,N-dimethyl ammonium betaine. N-(3-sulphopropyl)-N-methacryloxy-ethyl-N,N-dimethyl ammonium betaine is commercially available from Rashig AG, Germany. N-(3-sulphopropyl)-N-acryloxyethyl-N, N-dimethyl ammonium betaine may be prepared by condensation of N,N-dimethyl aminoethyl acrylate with 1,3-propanesultone. This latter betaine monomer may also be prepared by the addition of N,N-dimethyl aminoethyl acrylate to the condensation product of epichlorohydrin and sodium bisulphite.

Generally the zwitterionic monomer will comprise from about 10 to about 50 mole % of the monomer mixture used to prepare the copolymer, preferably about 10 to about 20 mole %. The balance of the monomer mixture will be a hydrophobic monomer, a hydrophilic monomer or a mixture of such monomers.

The hydrophobic monomer must be one which is copolymerizable with the other monomers of the copolymer. A combination of different hydrophobic monomers can be used. The hydrophobic monomer may be an acrylic or methacrylic ester of a non-tertiary alcohol, which alcohol has from 1 to 14 carbon atoms, preferably from 2 to 12 carbon atoms. It is preferred that the non-tertiary alcohol is an alkanol. Suitable alkanols to form the ester are alkanols such as ethanol, 1-propanol, 2-propanol, 1-butanol, 2-butanol, 1-pentanol, 2-pentanol, 3-pentanol, 2-methyl-l-butanol, 1-hexanol, 2-hexanol, 2-methyl-1-pentanol, 3-methyl-1-pentanol, 2-ethyl-l-butanol, 3-methyl-l-pentanol, 2-ethyl-l-butanol, 3,5,5-trimethyl-l-hexanol, 3-heptanol, 1-octanol, 2-octanol, iso-octanol, 2-ethyl-1-hexanol, 1-decanol, 1-dodecanol, 1-tridecanol and 1-tetradecanol.

Preferred hydrophobic monomers are the esters of (meth) acrylic acid with butyl alcohol, iso-octyl alcohol or 2-ethyl-l-hexanol or a combination thereof.

The hydrophobic monomer can range generally from 0 to about 85 mole % of the monomer mixture used to prepare the copolymer, more preferably from about 50 to about 75 mole %. Generally a higher content of hydrophobic monomer will reduce water-dispersibility of the final copolymer.

The hydrophilic monomer must be one which is copolymerizable with the other monomers of the copolymer. The hydrophilic monomer may have hydroxy, alkoxy, or amide functional groups. Examples of suitable hydrophilic monomers are hydroxyethyl acrylate, hydroxypropyl acrylate, hydroxybutyl acrylate, methoxyethyl acrylate, ethoxyethyl acrylate, ethoxyethoxyethyl acrylate, propoxyethyl acrylate, propoxypropyl acrylate, butoxyethyl acrylate, butoxypropyl acrylate, carbowax 750, carbowax 550 and acrylamide. A mixture of different hydrophilic monomers may be used.

The hydrophilic monomer can range generally from 0 to about 50, preferably up to about 20 mole % of the monomer mixture used to prepare the copolymer. Generally a higher hydrophilic monomer content will increase the water-dispersibility of the copolymer.

As is known, various other compounds can be added to improve the characteristics of the final adhesive formulation. Compounds such as PVP K-30 and PVP K-90 (commercially available polyvinlypyrrolidones of molecular weight 57,500 and 1,270,000 respectively) can be added to improve the strength and toughness of the base adhesive copolymer. FC-171 (a fluorochemical) can be added, for example as a 10% aqueous solution, to improve wetting characteristics of the final adhesive formulation.

A pressure sensitive adhesive tape may be made by applying the pressure sensitive adhesive composition to one or more surfaces of a substrate backing to form a one-sided or double-sided tape. If the tape is to be repulpable, the substrate backing should also be repulpable. Such a repulpable backing is a tissue paper.

A release liner may be used to cover and protect the exposed surfaces of the pressure sensitive adhesive tape between manufacture and use. Commercially available release liners include siliconized paper release liners.

Repulpable adhesives may be applied directly to a substrate, that is, without any backing, in the form of a spray or a bead. For example, in papermaking, the PSA may be applied to a paper surface adjacent the trailing edge of one roll and then the leading edge of the next roll may be pressed directly onto the adhesive thus joining the edges of the two rolls. When used without a backing, the adhesive can be fortified with fibres for easy handling. For a repulpable tape, suitable fibres include cellulosic fibres or polyvinyl alcohol fibres.

Repulpable PSA formulations should adhere to at least common types of paper such as AKD sized; paper for offset printing ("offset"); European bond paper; Canadian bond paper; and paper for rotogravure printing ("rotogravure").

The tackifiers and plasticizers are added to an adhesive polymer, together with any other additives, to form an adhesive composition. Whilst the amounts used may vary depending on the nature of the components of the adhesive composition, generally they are effective when added at a rate of 30 to 100 parts by weight based on 100 parts by weight of the adhesive polymer. Such adhesive compositions may be prepared in the usual way by blending or mixing. The tackifiers and plasticizers may be added, for example, to an aqueous emulsion of the formed adhesive polymer, or may be added to a monomer feed stream before formation of the adhesive polymer.

Besides their use with zwitterionic copolymers in repulpable adhesive formulations, the zwitterionic tackcifiers and plasticizers of the invention may be used in a variety of adhesive applications such as labels, masking tapes and stamps. They may be used as tackifiers and plasticizers with other ionic polymers.

Test Procedures

It is believed that a brief explanation of certain test procedures will be helpful in understanding the invention.

Delrin Wheel Tack Test

In this test, a standard Delrin wheel weighing 28.8 g with diameter of 8.13 cm (3.2 inches), a rim width of 1.9 cm (0.75 inches), a thickness of 0.16 cm ($\frac{1}{16}$ inches), a hollow axle with a diameter of 1.27 cm (0.5 inches) and a length of 3.175 cm (1.25 inches) is rolled down a plane having a length of 26.7 cm (10.51 inches) and incline of 24 to a horizontal surface on which the tape to be evaluated is positioned, adhesive side up. The distance the wheel rolls along the horizontal adhesive surface is measured in mm, the tack being inversely proportional to the distance. For an adhesive formulation for a permanent tape, the distance the Delrin wheel rolls may be around 300 mm or more. The shorter the distance the wheel rolls, the greater the tack. For example, for the greater tack required by an adhesive formulation for a temporary tape, a lower value, such as 30 mm, might be expected.

Repulpability

Dispersibility is measured by evaluating repulpability according to TAPPl test UM-213. Samples are prepared by coating 2 gm of the adhesive or adhesive formulation to be tested onto one side of a backing strip 20 cm by 2.54 cm (2 gm on each side to test double faced tape). For double faced tape, one sample is sandwiched between two 20 cm×2.54 cm strips of blotter paper; and for single faced tape, two samples are adhered to blotter paper. The samples are cut into approximately 1.5 cm squares. To these squares are added a sufficient number of 1.5 cm squares of uncoated blotter paper to make a total of samples and uncoated blotter paper of 15 g, and all the squares are placed in a Waring blender with 500 mL of water. After the blender has run for 20 seconds, it is stopped for 1 minute while the stock which has splashed up the sides and onto the cover is washed back into the bottom with a water bottle. The blender is again run for 20 seconds, washed down as before, and run for a final 20 second cycle. The stock is then removed from the blender and made into a handsheet on a sheet mold. The sheet is removed from the mold, pressed between sheets of blotter stock for 1.5 minutes in a hydraulic press, dried, and examined for any particles of unrepulped tape. If no particles are present, the tape is considered to have passed the test.

Another method for determining the repulpability of these products is the PTS Method. For this method, copy/bond paper is cut into strips of 48 g each. To each strip is applied 2 g of the adhesive formulation. Each of these strips is then a sample to be tested. The test is normally conducted at pH 7, but pH 4 and pH 10 may be used for a full test to determine repulpability under acidic and alkaline conditions. The samples are transferred into a standard disintegrator and diluted with water to obtain a total volume of 2,000 mL. The sample is disintegrated for 10 minutes (±30 seconds) with a rotor speed of about 3000 rpm. The pulp suspension is put in a vessel, diluted to a total volume of 10 L and homogenized for approximately 2 minutes. 400 ml samples of the resulting homogenized liquid are removed to make handsheets. The test handsheets, so prepared, are viewed against a light source. Any defects or transparent spots, caused by non-dispersible constituents in the homogenized liquid used to prepare the handsheets, are counted and characterized by size and colour.

If no defects or transparent specs are observed, the formulation used in the sample will be considered repulpable. If a few transparent specs are observed, the formulation will be considered "marginally" repulpable. That is, the substance will be considered water dispersible but not repulpable according to the PTS test used.

These tests do not apply to tape products where the backing is a polyester film, which does not lend itself to repulping. Such backings are strong, however, and may be used in tape constructions, provided the loosed backing is mechanically removed.

Unless otherwise stated, the PTS test method at pH 7 was used for repulpability tests in the following examples.

T-Peel Adhesion Test

This test is for 180° peel adhesion to paper. A 3.175 cm strip of bond paper is laminated to a 5 cm×12.5 cm stainless test panel using a double-faced pressure sensitive tape. One end of a 2.54 cm×25 cm strip of sample tape is then applied to laminated bond paper (if the sample is a double-faced tape, then 68 g/m$^2$ Kraft paper backing is placed on one adhesive side of the sample). To ensure uniform adhesive contact, a 2 kg roller is passed over the 12.5 cm sample length at a rate of 50 mm/minute. The tape is then doubled back on itself and peeled from the bond paper surface at a rate of 50 mm/minute. The force required to remove the tape is recorded. The values obtained from the test are expressed in the units of Newtons per cm.

Static Shear

A static shear test provides information on the ability of the splice to withstand shear forces in a paper processing operation. An overlap splice (2.54 cm 2.54 cm) is prepared and pressed with a 2 kg roller (2 passes). The splices are conditioned for 20 minutes to acclimatize them to the temperature and humidity of the test conditions, and then a 1 kg weight is suspended from the splice in a vertical manner. The time in minutes for the splice to fail is recorded.

Heat Resistance

This test simulates the shear forces encountered by a paper splice at elevated temperature.

An overlap splice (2.54 cm×2.54 cm) is prepared and rolled twice with a 5 kg roller. The splice is allowed to dwell or condition for 1 minute prior to being contacted with a curved heated surface, which is maintained at 150° C. One end of the splice is held with a clamp to prevent it from moving during the test. The other end of the splice is threaded over the curved surface. A 2 kg weight is attached to this end which is allowed to hang, supporting the weight. The time required for the splice to separate (adhesive shear failure) is then measured in seconds. The time is measured from the moment of first contact with the heated surface. If the splice does not separate in 2 minutes, the amount of slippage in mm is recorded.

Abbreviations

In the following examples and tables, abbreviations used are as follows:

AA stands for acrylic acid;
BA stands for butyl acrylate;
EOA stands for 2-ethoxyethyl acrylate;
EOEOA stands for 2-(2-ethoxy)ethoxy ethyl acrylate;
IOA stands for iso-octyl acrylate;
MEA stands for 2-methoxyethyl acrylate;
BuOEtA stands for 2-butoxyethyl acrylate;
CTA stands for chain transfer agent;
AES-21 stands for Disponil AES-21 which is an alkyl phenol ether sulphate sodium salt surfactant available from Hen)-el;
SPE stands for N-(3-sulphopropyl)-N-methacryloxy-ethyl-N,N-dimethyl ammonium betaine;
SP-A stands for N-(3-sulphopropyl)-N-acryloxy-ethyl-N,N-dimethyl ammonium betaine;
HEA stands for 2-hydroxyethyl acrylate;
EHA stands for 2-ethylhexyl acrylate; Bu diEtOH, Me diEtOH, diMe 1-prOH and diEtOH 2-prOH refer to the zwitterionic compounds obtained by reaction of 1,3-propane sultone with butyldiethanol amine, methyldiethanol amine, N,N-dimethyl-l-propanol amine and N,N-diethanol-2-propanol amine respectively. The full structures of these four zwitterionic compounds are given above.

Preparation of Sulphobetaines

Me diEtOH

N-methyldiethanolamine (50.0 g, 0.420 mol) was dissolved in dry acetonitrile (200 mL) and added to a 1 L reaction vessel. The vessel was equipped with a condenser, an argon purge, an addition funnel with pressure equalizing sidearm, and a mechanical stirrer. The contents were stirred under argon and heated to 60–65° C. 1,3-Propanesultone (48.7 g, 0.400 mol) was dissolved in acetonitrile (100 mL) and transferred to the addition funnel. This solution was added dropwise for 1 hour and the reaction was maintained at 60–65° C. overnight. After cooling to ambient temperature, the product was filtered and washed successively with acetonitrile (200 mL) and diethyl ether (200 mL). After drying the white solid under vacuum for 12 hours, a yield of 86.3% was obtained of a compound of the formula:

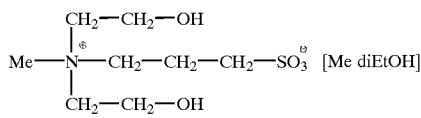

The final structure was confirmed by standard spectroscopic techniques including mass spectrometry, nuclear magnetic resonance, and infrared.

Bu diEtOH

N-butyldiethanolamine (83.27 g, 0.52 mol) was dissolved in acetonitrile (300 mL) and added to a 1 L reaction vessel. The vessel was equipped with a condenser, an argon purge, an addition funnel with pressure equalizing sidearm, and a mechanical stirrer. The contents were stirred under argon and heated to 55–60° C. 1,3-Propane sultone (59.92 g, 0.49 mol) was dissolved in acetonitrile (100 mL) and transferred to the addiiton funnel. The 1,3-propane sultone was added over 1 hour 25 minutes and the reaction was maintained at 60° C. overnight. The acetonitrile was removed under reduced pressure and the solid product washed with methylene chloride (200 mL). After drying under vacuum for 12 hours, a yield of 77.0% was obtained of a compound of the formula

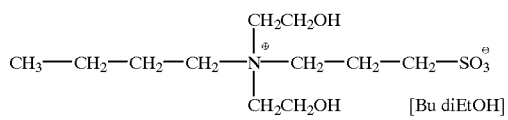

3-Dimethylamino-1-propanol (15.48 g, 0.15 mol) was dissolved in acetonitrile (125 mL) and added to a 250 mL reaction vessel. The vessel was equipped with a condenser, an argon purge, an addition funnel with pressure equalizing sidearm, and a mechanical stirrer. The contents were stirred under argon and heated to 55–60° C. 1,3-Propane sultone (17.41 g, 0.143 mol) was dissolved in acetonitrile (10 mL) and transferred to the addition funnel. The 1,3-propane sultone was added over 1 hour and the reaction was maintained at 60° C. for an additional seven hours. After cooling to ambient temperature, the product was recovered by filtration and washed successively with 100 mL quantities of acetonitrile and diethyl ether. The white powder was dried under vacuum overnight. A yield of 98.2% was obtained of a compound of the formula

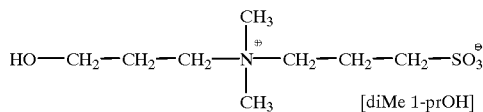

diEtOH 2-prOH
1-[N,N-Bis(2-hydroxyethyl)aminio]-2-propanol(12.08 g, 0.074 mol) was dissolved in acetonitrile (150 mL) and added to a 500 mL reaction vessel. The vessel was equipped with a condenser, an argon purge, an addition funnel with pressure equalizing sidearm, and a mehanical stirrer. The contents were stirred under argon and heated to 60–65° C. 1,3-Propane sultone (8.58 g, 0.070 mol) was dissolved in acetonitrile (20 mL) and transferred to the addition funnel. Potassium iodide (0.13 g, 1.0% based on the weight of amine) was added to the reaction according to a method described in U.S. Pat. No. 3,280,179. The 1,3-propane sultone was added over 1 hour and the reaction was maintained at 60° C. overnight. The acetonitrile was removed under reduced pressure and a nearly quantitative yield was obtained of a yellow, viscous liquid (which has also been obtained as an amorphous solid) corresponding to a compound of the formula

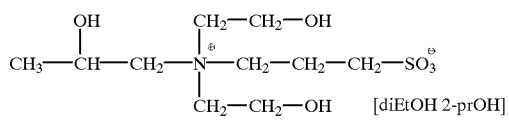

Essentially the same procedure was employed for the preparation of other sulphobetaines according to the invention.
Preparation of Copolymers EXAMPLES 1—1 to 1-8

Copolymers were prepared using various monomers in combination with the zwitterionic monomer SPE. The copolymers were prepared by batch or pre-emulsification polymerization.

To illustrate, details of the preparation of Examples 1-5 and 1-6 are provided. The other copolymers of Examples 1—1 to 1-8 were obtained by similar procedures.

Preparation of Copolymers of Examples 1–5 and 1–6 Preparation of Example 1-5

Into a 1-litre reaction vessel were placed the following monomers: butyl acrylate (27.1 g, 0.21 mol), isooctyl acrylate (14.2 g, 0.08 mol), SPE (16.1 g, 0.06 mol) and 2-ethoxy (2-ethoxy)ethyl acrylate (7.25 g, 0.04 mol). Triton X-200 (4.62 g) and deionized water (194 g) were added and the flask was fitted with a mechanical stirrer and purge tubes. The contents were stirred at 55° C. with purging under argon for 45 minutes. Potassium persulfate (0.43 g) was added and the reaction was allowed to proceed for six hours. The resulting emulsion was filtered through cheese cloth.

Preparation of Example 1-6

Into a 1-litre reaction vessel were placed the following monomers: butyl acrylate (60 g, 0.47 mol), 2-hydroxyethyl acrylate (4.8 g, 0.04 mol), and SPE (16.8 g, 0.06 mol). Triton X-200 (5.8 g) and deionized water (163.2 g) were added and the flask was fitted with a mechanical stirrer and purge tubes. The contents were stirred at 55° C. with purging under argon for 45 minutes. Potassium persulfate (0.212 g) was added and the reaction was allowed to proceed for five hours. The resulting emulsion was filtered through cheese cloth.

Table 1 shows the proportions of monomers used in each of the examples in mole % of the total monomer content of the polymerization mixture. The monomers BA and IOA are examples of hydrophobic monomers and EOEOA, HEA and AA are examples of hydrophilic monomers. The proportions used in Examples 1 to 8 produced copolymers having a hydrophobic character.

TABLE 1

| | Hydrophobic Copolymers | | | | | |
| Example | BA | IOA | EOEOA | HEA | AA | SPE |
| --- | --- | --- | --- | --- | --- | --- |
| 1-1 | 55 | 20 | | 5 | | 20 |
| 1-2 | 52 | 21 | | 16 | | 11 |
| 1-3 | 55 | 20 | | 10 | | 15 |
| 1-4 | 20 | 55 | | 5 | | 20 |
| 1-5 | 55 | 20 | 10 | | | 15 |
| 1-6 | 82 | | | 7.4 | | 10.6 |
| 1-7 | 76.4 | | | | 5.2 | 18.4 |
| 1-8 | 80 | | | | | 20 |

The copolymers of Examples 1-1 to 1-7 were then used as base adhesive copolymers to prepare adhesive formulations 1-1F to 1-7F by adding tackifiers, plasticizers, PVP K-90 and FC-171 (10%) and adjusting the pH with butyldiethanol amine. The composition and final pH of each formulation is shown in Table 1F. In each formulation in Table 1F, "tack 1" was Bu diEtOH, "tack 2" was Tacolyn 98 and "Plast" was N-(2-hydroxy-3-sulphopropyl)-N,N-diinethyl-N-(3-hydroxypropyl)-ammonium betaine. Besides the pH values, the quantities shown in Table 1F are all parts by weight based on one hundred parts by weight of the base adhesive copolymer.

TABLE 1F

Formulations for the Hydrophobic Copolymers 1-1 to 1-7 of Table 1

| Code | Tack 1 | Tack 2 | Plast | PVP | FC-171 | pH |
|---|---|---|---|---|---|---|
| 1-1F | 10 | 10 | | | 0.05 | 7.35 |
| 1-2F | 40 | 10 | | | 0.05 | 6.78 |
| 1-3F | 40 | 11.5 | | | 0.05 | 6.61 |
| 1-4F | 40 | 10 | | | 0.05 | 7.68 |
| 1-5F | 40 | 10 | | | 0.05 | 7.41 |
| 1-6F | 60 | | 2 | 2 | 0.06 | 4.51 |
| 1-7F | 60 | | 2 | 2 | 0.06 | 7.68 |

The seven formulations, 1-1F to 1-7F, were tested on five types of paper: AKD sized offset; bond (European); bond (Canadian); and rotogravure. The tests were: shear strength; heat resistance; T-peel; and wheel tack (Delrin wheel). The test procedures were those described above. The results for each formulation are shown in tables 1-lF to 1-7F.

TABLE 1-1F (BA/IOA/HEA/SPE, 55/20/5/20)

| Paper | Shear Strength min. | Heat Resistance (150° C. 2 kg) sec. | T-Peel N/cm | Wheel Tack mm |
|---|---|---|---|---|
| AKD Sized | 1226+ | 120 + 0.1 | 0.04 | 300 |
| Offset | 10000 | 120 + 0.1 | 0.31 | 247 |
| Bond (Eur) | 1604 | 120 + 0.1 | 0.04 | 300 |
| Bond (Can) | 6629 | 120 + 0.1 | 0.08 | 300 |
| Rotogravure | 10000 | 120 + 0.1 | 0.63 | 42 |

TABLE 1-2F (BA/IOA/HEA/SPE, 52/21/16/11)

| Paper | Shear Strength min. | Heat Resistance (150° C. 2 kg) sec. | T-Peel N/cm | Wheel Tack mm |
|---|---|---|---|---|
| AKD Sized | 10000 | 120 + 0.1 | 0.12 | 300 |
| Offset | 10000 | 120 + 0.25 | 1.26 | 300 |
| Bond (Eur) | 10000 | 120 + 0.1 | 0.12 | 300 |
| Bond (Can) | 10000 | 120 + 0.1 | 0.47 | 300 |
| Rotogravure | 10000 | 120 + 0.25 | 0.94 | 104 |

TABLE 1-3F (BA/IOA/HEA/SPE, 55/20/10/15)

| Paper | Shear Strength min. | Heat Resistance (150° C. 2 kg) sec. | T-Peel N/cm | Wheel Tack mm |
|---|---|---|---|---|
| AKD Sized | 1662 | 120 + 0.2 | 0.08 | 300 |
| Offset | 10000 | 120 + 0.15 | 0.83 | 92 |
| Bond (Eur) | 1507 | 120 + 0.1 | 0.08 | 300 |
| Bond (Can) | 5522 | 120 + 0.1 | 0.16 | 300 |
| Rotogravure | 10000 | 120 + 0.25 | 0.87 | 182 |

TABLE 1-4F (BA/IOA/HEA/SPE, 20/55/5/20)

| Paper | Shear Strength min. | Heat Resistance (150° C. 2 kg) sec. | T-Peel N/cm | Wheel Tack mm |
|---|---|---|---|---|
| AKD Sized | 740 | 120 + 0.2 | 0.08 | 300 |
| Offset | 10000 | 120 + 0.5 | 0.71 | 245 |
| Bond (Eur) | 457 | 120 + 0.4 | 0.08 | 300 |
| Bond (Can) | 299 | 120 + 0.25 | 0.16 | 300 |
| Rotogravure | 10000 | 120 + 0.3 | 0.98 | 103 |

TABLE 1-5F (BA/IOA/HEA/SPE, 55/20/10/15)

| Paper | Shear Strength min. | Heat Resistance (150° C. 2 kg) sec. | T-Peel N/cm | Wheel Tack mm |
|---|---|---|---|---|
| AKD Sized | 421 | 120 + 0.2 | 0.12 | 300 |
| Offset | 23630 | 120 + 0.5 | 0.91 | 197 |
| Bond (Eur) | 157 | 120 + 0.4 | 0.20 | 300 |
| Bond (Can) | 288 | 120 + 0.25 | 0.43 | 300 |
| Rotogravure | 10000 | 120 + 0.3 | 0.98 | 37 |

TABLE 1-6F (BA/HEA/SPE, 82/7.4/10.6)

| Paper | Shear Strength min. | Heat Resistance (150° C. 2 kg) sec. mm | T-Peel N/cm | Wheel Tack mm |
|---|---|---|---|---|
| AKD Sized | 2988 | 120 + 0.1 | 0.87 | 230 |
| Offset | 10000 | 120 + 0.1 | 1.65 | 75 |
| Bond (Eur) | 1529 | 120 + 0.0 | 0.98 | 114 |
| Bond (Can) | 10000 | 120 + 0.05 | 1.65 | 200 |
| Rotogravure | 10000 | 120 + 0.0 | 0.98 | 30 |

TABLE 1-7F (BA/AA/SPE, 76.4/5.2/18.4)

| Paper | Shear Strength min. | Heat Resistance (150° C. 2 kg) sec. mm | T-Peel N/cm | Wheel Tack mm |
|---|---|---|---|---|
| AKD Sized | 263 | 120 + 0.3 | 0.98 | 300 |
| Offset | 1504 | Failed | 2.17 | 118 |
| Bond (Eur) | 243 | 120 + 0.15 | 1.14 | 300 |
| Bond (Can) | 486 | 120 + 0.3 | 1.73 | 300 |
| Rotogravure | 2550 | 120 + 0.2 | 0.75 | 65 |

Each of the seven formulations, 1-1F to 1-7F, was tested for repulpability using the PTS method as described above. The formulations of Examples 1-2F and 1-7F were found to be repulpable without further modification of the base adhesive copolymers.

EXAMPLES 2-1 to 2-9

Copolymers were prepared using various monomers in combination with the zwitterionic monomer SPE or both SPE and SP-A.

To illustrate, details of the preparation of Examples 2-4, 2-5, 2-6, 2-7 and 2-8 are provided. The other copolymers of Examples 2-1 to 2-9 were obtained by similar procedures.
Preparation of Copolymers of Examples 2-4, 2-5, 2-6, 2-7 and 2-8
Preparation of Example 2-4
Into a 1-litre reaction vessel were placed SPE (4.39 g, 0.016 mol), SP-A (4.17 g, 0.016 mol), AES-21 (1.70 g), Triton X-405 (0.62 g), deionized water (103 g), and sodium carbonate (0.13 g). The contents were stirred at 70° C. and purged for 20 minutes. Potassium persulfate (0.32 g) was dissolved in a minimal amount of water and was added in one portion. 2-Ethoxyethyl acrylate (25.7 g, 0.178 mol) was added dropwise over 12 minutes and the reaction was allowed to proceed for an additional 50 minutes. The resulting emulsion was filtered through the cheese cloth.
Preparation of Example 2-5
Into a 250 mL reaction vessel were placed SPE (3.74 g, 0.013 mol), SPA (3.55 g, 0.013 mol), 2-hydroxethyl acrylate (2.84 g, 0.02 mol), 2-butoxyetlhyl acrylate (24.6 g, 0.14 mol), deionized water (105 g), AES-21 (1.77 g), and Triton X-405 (0.2 g). The contents were stirred for seven minutes and sodium carbonate (0.14 g) was added to the reaction. The contents were brought to a temperature of 70° C. After purging for 40 minutes the potassium persulfate (0.35 g) was added. The reaction was allowed to proceed for an additional 1 hour 25 minutes. The resulting emulsion was filtered through cheese cloth.
Preparation of Example 2-6
In a 1-litre reaction vessel were placed the following monomers: 2-butoxyethyl acrylate (18.23 g, 0.11 mol), SPE (2.62 g, 0.009 mol), SP-A (2.49 g, 0.009 mol), Triton X-200 (1.67 g), and deionized water (70 g). The flask was fitted with a mechanical stirrer and purge tubes. The contents were stirred at 65° C. with purging under argon for 1 hour 30 minutes. Potassium persulfate (0.15 g) was added and the reaction was allowed to proceed for eight hours. The resulting emulsion was filtered through cheese cloth.
Preparation of Example 2-7
Into a 500 mL reaction vessel were placed SPE (4.48 g, 0.016 mol), SP-A (4.26 g, 0.016 mol), deionized water (125 g), AES-21 (1.93 g), and Triton X-405 (0.24 g). The contents were stirred for 5 minutes and sodium carbonate (0.16 g) was added. The contents were brought to a temperature of 70° C. After purging for 30 minutes the potassium persulfate (0.42 g) was added. 2-Butoxyethyl acrylate (22.81 g, 0.132 mol) and 2-ethylhexyl acrylate (10.18 g, 0.055 mol) were combined and added dropwise over 25 minutes. the reaction was allowed to proceed for an additional 52 minutes. The resulting emulsion was filtered through cheese cloth.
Preparation of Example 2-8
Into a 250 mL reaction vessel were placed SPE (4.60 g, 0.016 mol), SP-A (4.37 g, 0.016 mol), deionized water (105 g), AES-21 (1.95 g), and Triton X-405 (0.24 g). The contents were stirred for 15 minutes and sodium carbonate (0.17 g) was added to the reaction. The contents were brought to a temperature of 70° C. After purging for 34 minutes the potassium persulfate (0.43 g) was added. 2-Butoxyethyl acrylate (9.46 g, 0.06 mol) and 2-ethylhexyl acrylate (24.3 g, 0.13 mol) were combined and added dropwise over 20 minutes. The reaction was allowed to proceed for an additional one hour. The resulting emulsion was filtered through cheese cloth.

Table 2 shows the proportions of monomers used in each of the examples in mole % of the total monomer content of the polymerization mixture. The monomer EHA is a hydrophobic monomer. Monomers MEA, EOEOA, EOA, BuO-EtA and HEA are hydrophilic monomers. The copolymers prepared in these examples had a hydrophilic character.

TABLE 2

| | Hydrophilic Copolymers | | | | | | | |
|---|---|---|---|---|---|---|---|---|
| Example | EHA | MEA | EOEOA | EOA | BuOEtA | HEA | SPE | SP-A |
| 2-1 | | 85 | | | | | 15 | |
| 2-2 | | 90 | | | | | 10 | |
| 2-3 | | 85 | | | | | 15 | |
| 2-4 | | | 85 | | | | 7.5 | 7.5 |
| 2-5 | | | | | 71 | 12 | 6.7 | 6.7 |
| 2-6 | | | | | 85 | | 7.5 | 7.5 |
| 2-7 | 25 | | | | 60 | | 7.5 | 7.5 |
| 2-8 | 60 | | | | 25 | | 7.5 | 7.5 |
| 2-9 | | 87 | | | | | 13 | |

The copolymers of Examples 2-1 to 2-9 were then used as base adhesive copolymers to prepare adhesive formulations 2-1F to 2-9F by adding tackifiers, plasticizers, PVP K-90 and FC-171 (10%) and adjusting the pH with butyldiethanol amine as was done for Examples 1—1 to 1-7. The base adhesive copolymers used for formulations 2-1AF and 2-3F were prepared by polymerizing the monomer mixture in contact with 0.5 parts by weight, based on 100 parts by weight of the total monomer mixture, of 1-dodecanethiol as a chain transfer agent (CTA). The composition and final pH is shown in Table 2F. In each formulation in Table 2F, "tack 1" was Bu diEtOH, "tack 2" was Tacolyn 98, "Lack 3" was a mixture of 87% by weight of Bu diEtOH and 13% by weight of Me diEtOH, and "plast" was N-(2-hydroxy-3-sulphopropyl)-N,N-dimethyl-N-(3-hydroxypropyl)-ammonium betaine. Besides the pH values, the quantities shown in the table are all parts by weight based on one hundred parts by weight of the base adhesive copolymer.

TABLE 2F

Formulations for the Hydrophilic Copolymers 2-1 to 2-9 of Table 2

| Code | Tack 1 | Tack 2 | Tack 3 | Plast | PVP | FC-171 | CTA | pH |
|---|---|---|---|---|---|---|---|---|
| 2-1F | 40 | 10 | | | | 0.05 | | 7.65 |
| 2-1AF | 40 | 10 | | | | 0.05 | 0.5 | 7.95 |
| 2-2F | 40 | 10 | | | | 0.05 | | 6.18 |
| 2-3F | 40 | | 10 | | | 0.05 | 0.5 | 8.53 |
| 2-4F | 40 | | | | | 0.06 | | 5.31 |
| 2-5F | 40 | | 10 | | | 0.06 | | 3.47 |
| 2-6F | 40 | | | | | 0.05 | | 8.52 |
| 2-7F | 40 | | | | | 0.06 | | 4.19 |
| 2-8F | 40 | | | | | 0.06 | | 4.19 |
| 2-9F | | | 70 | | 0.8 | 0.07 | | 8.22 |

Each of the formulations, 2-1F to 2-9F, was tested on five types of paper: AKD sized; offset; bond (European); bond (Canadian); and rotogravure. The tests were: shear strength; heat resistance; T-peel; and wheel tack (Delrin J wheel). The test procedures were those described above. The results for each formulation are shown in tables 2-1F to 2-9F.

TABLE 2-1F (MEA/SPE, 85/15)

| Paper | Shear Strength min. | Heat Resistance (150° C. 2 kg) sec. mm | T-Peel N/cm | Wheel Tack mm |
|---|---|---|---|---|
| AKD Sized | 160 | 120 + 0.2 | 0.08 | Not Determined |
| Offset | 10000 | 120 + 0.25 | 1.5 | Not Determined |
| Bond (Eur) | 1382 | 120 + 0.15 | 0.08 | 260 |
| Bond (Can) | 10000 | 120 + 0.25 | 0.35 | Not Determined |
| Rotogravure | 10000 | 120 + 0.1 | 1.14 | 200 |

TABLE 2-1AF (MEA/SPE, 85/15)

| Paper | Shear Strength min. | Heat Resistance (150° C. 2 kg) sec. mm | T-Peel N/cm | Wheel Tack mm |
|---|---|---|---|---|
| AKD Sized | 974 | 120 + 0.5 | 0.71 | 300 |
| Offset | 4032 | 120 + 0.7 | 0.79 | 31 |
| Bond (Eur) | 1557 | 120 + 0.6 | 0.98 | 300 |
| Bond (Can) | 1542 | 120 + 0.5 | 1.34 | 164 |
| Rotogravure | 3904 | 120 + 0.6 | 0.63 | 26 |

TABLE 2-2F (EOEOA/SPE, 90/10)

| Paper | Shear Strength min. | Heat Resistance (150° C. 2 kg) sec. mm | T-Peel N/cm | Wheel Tack mm |
|---|---|---|---|---|
| AKD Sized | 142 | 120 + 0.5 | 0.12 | 300 |
| Offset | 4334 | 120 + 0.15 | 0.94 | 59 |
| Bond (Eur) | 482 | 120 + 0.15 | 0.16 | 300 |
| Bond (Can) | 577 | 120 + 0.1 | 0.63 | 205 |
| Rotogravure | 10000 | 120 + 0.15 | 0.95 | 41 |

TABLE 2-3F (EOEOA/SPE, 85/15)

| Paper | Shear Strength min. | Heat Resistance (150° C. 2 kg) sec. mm | T-Peel N/cm | Wheel Tack mm |
|---|---|---|---|---|
| AKD Sized | 20.7 | Failed | 2.01 | 134 |
| Offset | 30.9 | Failed | 2.40 | 105 |
| Bond (Eur) | 24.1 | Failed | 2.28 | 300 |
| Bond (Can) | 25.8 | Failed | 2.20 | 133 |
| Rotogravure | 39.1 | Failed | 1.97 | 38 |

TABLE 2-4F (EOA/SPE/SP-A, 85/7.5/7.5)

| Paper | Shear Strength min. | Heat Resistance (150° C. 2 kg) sec. mm | T-Peel N/cm | Wheel Tack mm |
|---|---|---|---|---|
| AKD Sized | 74.3 | 120 + 0.8 | 0.1 | 300 |
| Offset | 138 | Failed | 0.51 | 300 |
| Bond (Eur) | 84 | 120 + 0.3 | 0.08 | 300 |

TABLE 2-4F-continued (EOA/SPE/SP-A, 85/7.5/7.5)

| Paper | Shear Strength min. | Heat Resistance (150° C. 2 kg) sec. mm | T-Peel N/cm | Wheel Tack mm |
|---|---|---|---|---|
| Bond (Can) | 66 | 120 + 0.4 | 0.16 | Not Determined |
| Rotogravure | 3562 | 120 + 0.0 | 0.79 | Not Determined |

TABLE 2-5F (BuOEtA/HEA/SPE/SP-A, 71/12/6.7/6.7)

| Paper | Shear Strength min. | Heat Resistance (150° C. 2 kg) sec. mm | T-Peel N/cm | Wheel Tack mm |
|---|---|---|---|---|
| AKD Sized | 16 | 120 + 0.0 | 0.06 | 300 |
| Offset | 5604 | 120 + 0.0 | 0.51 | Not Determined |
| Bond (Eur) | 11 | 120 + 0.0 | 0.12 | 300 |
| Bond (Can) | 4328 | 120 + 0.3 | 0.08 | Not Determined |
| Rotogravure | 5603 | 120 + 0.0 | 0.51 | 300 |

TABLE 2-6F (BuOEtA/SPE/SP-A, 85/7.5/7.5)

| Paper | Shear Strength min. | Heat Resistance (150° C. 2 kg) sec. mm | T-Peel N/cm | Wheel Tack mm |
|---|---|---|---|---|
| AKD Sized | 4260 | 120 + 0.6 | 2.63 | 21 |
| Offset | 4260 | Failed | 2.13 | 14 |
| Bond (Eur) | 4260 | 120 + 0.6 | 2.20 | 25 |
| Bond (Can) | 4260 | 120 + 0.8 | 2.36 | 17 |
| Rotogravure | 4260 | 120 + 0.35 | 2.36 | 24 |

TABLE 2-7F (EHA/BuOEtA/SPE/SP-A, 25/60/7.5/7.5)

| Paper | Shear Strength min. | Heat Resistance (150° C. 2 kg) sec. mm | T-Peel N/cm | Wheel Tack mm |
|---|---|---|---|---|
| AKD Sized | 35 | 120 + 0.2 | 0.2 | 42 |
| Offset | 1632 | 120 + 0.15 | 0.63 | 23 |
| Bond (Eur) | 113 | 120 + 0.1 | 0.39 | 55 |
| Bond (Can) | 29 | 120 + 0.1 | 0.43 | 23 |

TABLE 2-7F-continued (EHA/BuOEtA/SPE/SP-A, 25/60/7.5/7.5)

| Paper | Shear Strength min. | Heat Resistance (150° C. 2 kg) sec. mm | T-Peel N/cm | Wheel Tack mm |
|---|---|---|---|---|
| Rotogravure | 1632 | 120 + 0.0 | 1.1 | 20 |

TABLE 2-8F (EHA/BuOEtA/SPE/SP-A, 60/25/7.5/7.5)

| Paper | Shear Strength min. | Heat Resistance (150° C. 2 kg) sec. mm | T-Peel N/cm | Wheel Tack mm |
|---|---|---|---|---|
| AKD Sized | 585 | 120 + 0.2 | 0.74 | 70 |
| Offset | 1624 | 120 + 0.4 | 1.46 | 23 |
| Bond (Eur) | 1624 | 120 + 0.35 | 1.02 | 42 |
| Bond (Can) | 1624 | 120 + 0.3 | 1.46 | 21 |
| Rotogravure | 1624 | 120 + 0.4 | 1.46 | 16 |

TABLE 2-9F (MEA/SPE, 87/13)

| Paper | Shear Strength min. | Heat Resistance (150° C. 2 kg) sec. mm | T-Peel N/cm | Wheel Tack mm |
|---|---|---|---|---|
| AKD Sized | 192 | 120 + 0.4 | 0.63 | 96 |
| Offset | 177 | Failed | 1.85 | 25 |
| Bond (Eur) | 86 | 120 + 0.4 | 0.71 | 86 |
| Bond (Can) | 111 | 120 + 0.4 | 0.83 | 43 |
| Rotogravure | 346 | 120 + 0.6 | 0.79 | 28 |

Each of the formulations, 2-1F to 2-9F, was also tested for repulpability using the PTS method as described above. The formulations of examples 2-1F, 2-1AF, 2-2F, 2-3F, 2-4F and 2-9F were found to be repulpable without further modification of the base adhesive copolymers.

EXAMPLES 3-1 to 3-4

These examples demonstrate the effectiveness of zwitterionic tackifiers in combination with the zwitterionic copolymers. A tackifier was admixed with a copolymer, as the base adhesive copolymer, obtained by polymerizing SPE and MEA in a mole ratio of 13:87 (SPE:MEA) (see Example 2-9 in Table 2). Four different zwitterionic tackifiers were used, as shown in the first column of table 3 under the heading "tackifier". These tackifiers were used in varying proportions of 0.5, 0.63 and 0.75 parts per part of base copolymer by weight and on two different types of paper, bond paper and offset paper. Each of these compositions was then subjected to the Delrin wheel test. The base adhesive copolymer alone had a Delrin wheel value of 300 mm. The results, in mm travelled by the Delrin wheel, are shown in table 3. As can be seen from the table, addition of the tackifier significantly improved tack.

TABLE 3

Tackifier Evaluation - Wheel Tack

| Paper | Bond | | | Offset | | |
|---|---|---|---|---|---|---|
| Tackifier | 1:0.50 | 1:0.63 | 1:0.75 | 1:0.50 | 1:0.63 | 1:0.75 |
| Bu diEtOH | | 16 | | | 15 | |
| Me diEtOH | 50 | 45 | 34 | 16 | 20 | 16 |
| diMe 1-prOH | 55 | 63 | 54 | 27 | 23 | 33 |
| diEtOH | | 35 | | | 18 | |
| 2-prOH | | | | | | |

EXAMPLES 4-1 and 4-2

Two PSA compositions, a high tack composition and a low tack composition, were formulated. The base copolymer in each case was the copolymer of Example 1-8 of Table 1, a copolymer of BA/SPE having a mole ratio of 80:20. The zwitterionic tackifier A was Me diEtOH and B was Bu diEtOH. The zwitterionic plasticizer A was N-(2-hydroxy-3-sulphopropyl)-N, N-dimethyl-N-(3-hydroxypropyl)-ammonium betaine. PVP K-30 and PVP K-90 were added to improve the strength and toughness of the base copolymer of the formulation. FC-171 (10%) was added to improve wetting of the formulation. The quantities used are shown in table 4 as parts by weight based on 100 parts by weight of the base copolymer.

TABLE 4

Formulations

| Material | Ex 4-1 High Tack (parts by weight) | Ex 4-2 Low Tack (parts by weight) |
|---|---|---|
| BA/SPE Copolymer | 100 | 100 |
| Zwitterionic Tackifier "A" | 60 | |
| Zwitterionic Tackifier "B" | | 50 |
| Zwitterionic Plasticizer "A" | 10 | |
| PVP K-30 | 3.4 | |
| PVP K-90 | | 3 |
| FC-171 (10%) | 0.067 | 0.092 |

These two formulations 4-1 and 4-2 were then tested on five types of paper: AKD sized; offset; bond (European); bond (Canadian); and rotogravure. Measurements were taken for the following tests: shear strength; heat resistance; T-peel; wheel tack (Delrin wheel); and repulpability (PST test). In the column headed "repulpability" the entry "yes" indicates that the formulation was repulpable according to the PTS test described above. The type of paper used is shown in the left hand column under "paper" in tables 5 and 6. The results of the tests for formulation 4-1 (the high tack formulation) are shown in table 5 and the results of the tests for formulation 4-2 (the low tack formulation) are shown in table 6.

TABLE 5

"High Tack" Results (for formulation of Example 4-1)

| Paper | Shear Strength min. | Heat Resistance (150° C. 2 kg) sec. | T-Peel mm | Wheel Tack N/cm | Repulp 10 min. |
|---|---|---|---|---|---|
| AKD Size | 429.3 | 150 | 3.0 | 1.2 | 37 | Yes |
| Offset | 4400 | | | 2.0 | 25 | Yes |
| Bond (Eur.) | 461.7 | 150 | 0.0 | 1.6 | 49 | Yes |
| Bond (Can.) | 253.1 | 150 | 0.0 | 1.5 | 54 | Yes |
| Rotogravure | 4400 | | | | 21 | Yes |

TABLE 6

"Low Tack" Results (for formulation of Example 4-2)

| Paper | Shear Strength min. | Heat Resistance (150° C. 2 kg) sec. | T-Peel mm | Wheel Tack N/cm | Repulp 10 min. |
|---|---|---|---|---|---|
| AKD Size | 5600+ | 130+ | 0.1 | 0.59 | | Yes |
| Offset | 6944+ | 130+ | 0.2 | 1.8 | 300+ | Yes |
| Bond (Eur.) | 213.2 | 130+ | 0.2 | 0.19 | 49 | Yes |
| Bond (Can.) | 3042+ | 130+ | 0.1 | 0.35 | 300+ | Yes |
| Rotogravure | 3042+ | 130+ | 0.4 | 1.1 | 241 | Yes |

What is claimed is:

1. An adhesive composition comprising; 100 parts by weight of an adhesive polymer, and as a tackifier or plasticizer, 30 to 100 parts by weight of a zwitterionic compound.

2. An adhesive composition according to claim 1 wherein the composition is a pressure sensitive adhesive composition.

3. A tape comprising a substrate backing and having coated thereon an adhesive composition according to claim 1.

4. A tape comprising a substrate backing and having coated thereon an adhesive composition according to claim 2.

5. An adhesive composition comprising an adhesive polymer and, as a tackifier or plasticizer, a zwitterionic compound, wherein the zwitterionic compound is a compound of Formula I:

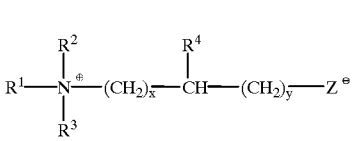

(I)

wherein $R^1$, $R^2$ and $R^3$ are each alkyl, hydroxyalkyl, aminoalkyl or aryl, which may be interrupted in the alkyl chain by one or more oxygen atoms;

$R^4$ is H or OH;

$Z^\ominus$ is $CO_2^\ominus$ or $SO_3^\ominus$; and x and y are each 0, 1 or 2, provided that the sum of x and y is less than or equal to 4.

6. An adhesive composition according to claim 5 wherein the alkyl components of $R^1$, $R^2$ and $R^3$ have from 1 to 12 carbon atoms.

7. An adhesive composition according to claim 5 wherein the alkyl components of $R^1$, $R^2$ and $R^3$ have from 1 to 8 carbon atoms.

8. An adhesive composition comprising an adhesive polymer and, as tackifier or plasticizer, a zwitterionic compound, wherein the zwitterionic compound is of formula:

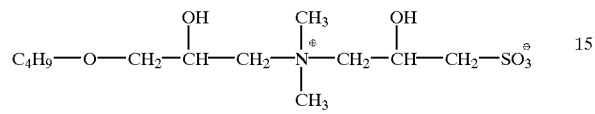

N-(2-hydroxy-3-sulphopropyl)-N,N-dimethyl-N-(3-butyloxy-2-hydroxypropyl)-ammonium betaine;

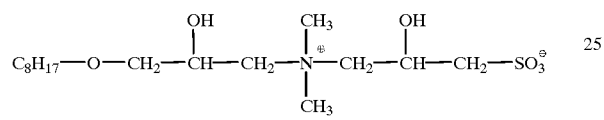

N-($^2$-hydroxy-3-sulphopropyl)-N,N-dimethyl-N-(3-octyloxy-2-hydroxypropyl)-ammonium betaine;

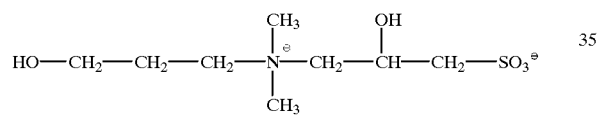

N-(2-hydroxy-3-sulphopropyl)-N,N-dimethyl-N-(3-hydroxypropyl)-ammonium betaine;

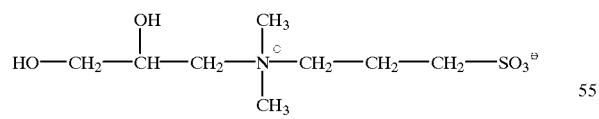

N-(3-sulphopropyl)-N,N-dimethyl-N-(2-3-dihydroxypropyl)-ammonium betaine;

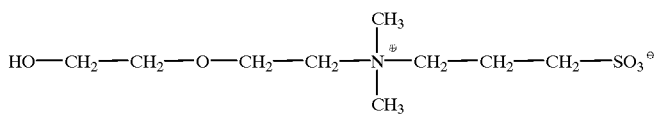

N-(3-sulphopropyl)-N-N-dimethyl-N-2-(2-hydroxyethyloxy)ethyl-ammonium betaine;

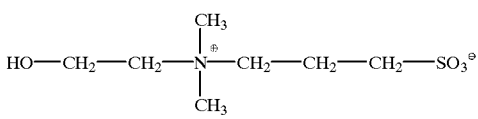

N-(3-sulphopropyl)-N,N-dimethyl-N-(2-hydroxyethyl)-ammonium betaine;

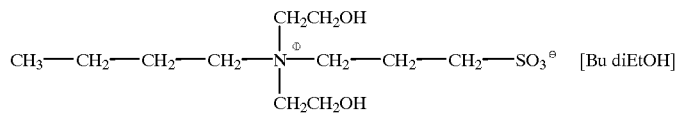

N-(3-sulphopropyl)-N,N-di(2-hydroxyethyl)-N-butyl-ammonium betaine;

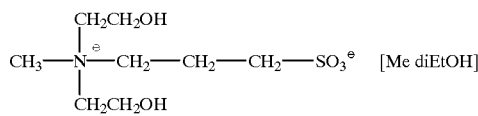 [Me diEtOH]

N-(3-sulphopropyl)-N,N-di(2-hydroxyethyl)-N-methyl-ammonium betaine;

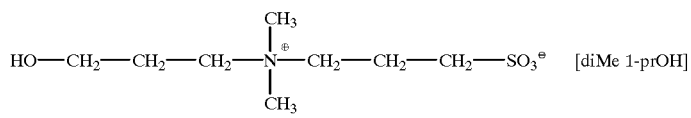 [diMe 1-prOH]

N-(3-sulphopropyl)-N,N-dimethyl-N-(3-hydroxypropyl)-ammonium betaine;

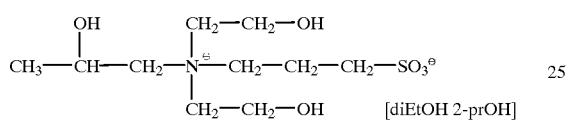 [diEtOH 2-prOH]

N-(3-sulphopropyl)-N,N-di(2-hydroxyethyl)-N-(2-hydroxypropyl)-ammonium betaine;

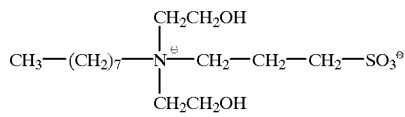

N-(3-sulphopropyl)-N,N-di(2-hydroxyethyl)-N-octyl-ammonium betaine; or

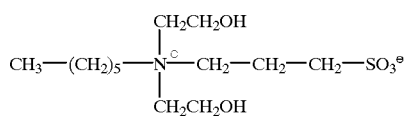

N-(3-sulphopropyl)-N,N-di(2-hydroxyethyl)-N-hexyl-ammonium betaine.

9. An adhesive composition comprising an adhesive polymer and, as tackifier or plasticizer, a zwitterionic compound, wherein the zwitterionic compound is a compound of formula:

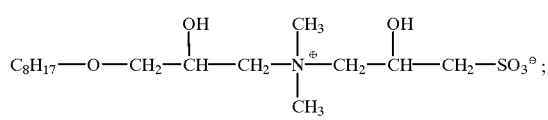

-continued

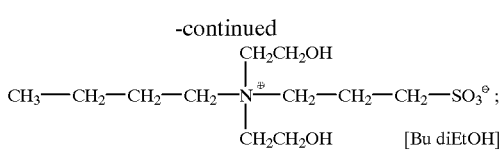 [Bu diEtOH]

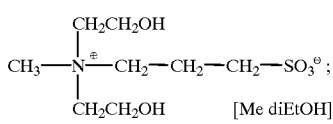 [Me diEtOH]

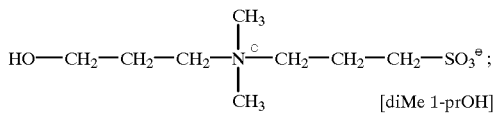 [diMe 1-prOH]

or

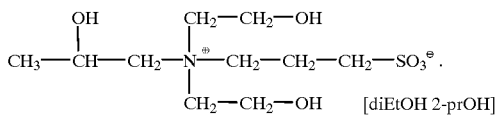 [diEtOH 2-prOH]

* * * * *

UNITED STATES PATENT AND TRADEMARK OFFICE
CERTIFICATE OF CORRECTION

PATENT NO.: 6,106,940
DATED: 8/22/00
INVENTOR(S): Kent E. Nielson, Kai Li, Terry J. Rayner It is certified that error appears in the above-identified patent and that said Letters Patent is hereby corrected as shown below:

Column 21, line 31, "N-($^2$-hydroxy-3" should read --N-(2-hydroxy-3--.

Signed and Sealed this

Seventeenth Day of April, 2001

*Attest:*

NICHOLAS P. GODICI

*Attesting Officer*   Acting Director of the United States Patent and Trademark Office

UNITED STATES PATENT AND TRADEMARK OFFICE
CERTIFICATE OF CORRECTION

PATENT NO. : 6,106,940
DATED : August 22, 2000
INVENTOR(S) : Kent E. Nielsen, Kai Li, Terry J. Rayner It is certified that error appears in the above-identified patent and that said Letters Patent is hereby corrected as shown below:

<u>Title page,</u>
Under section "[75]", "Kent E. Nielson" should read -- Kent E. Nielsen --.

Signed and Sealed this

Thirteenth Day of November, 2001

*Attest:*

Nicholas P. Godici

*Attesting Officer*

NICHOLAS P. GODICI
*Acting Director of the United States Patent and Trademark Office*